United States Patent
Goodhead et al.

(10) Patent No.: US 12,488,407 B1
(45) Date of Patent: Dec. 2, 2025

(54) ARTIFICIAL INTELLIGENCE INSPECTION SYSTEM AND METHOD

(71) Applicant: Flash Fire Inspector, LLC, Marietta, GA (US)

(72) Inventors: Simon Goodhead, Marietta, GA (US); David Mustard, Arvada, CO (US)

(73) Assignee: Flash Fire Inspector, LLC, Marietta, GA (US)

( * ) Notice: Subject to any disclaimer, the term of this patent is extended or adjusted under 35 U.S.C. 154(b) by 0 days.

(21) Appl. No.: 18/680,376

(22) Filed: May 31, 2024

(51) Int. Cl.
  *G06Q 30/00* (2023.01)
  *G06Q 50/26* (2024.01)
  *G06V 20/00* (2022.01)
  *G06V 20/70* (2022.01)
  *H04N 21/8405* (2011.01)

(52) U.S. Cl.
  CPC ........... *G06Q 50/265* (2013.01); *G06V 20/35* (2022.01); *G06V 20/70* (2022.01); *H04N 21/8405* (2013.01)

(58) Field of Classification Search
  None
  See application file for complete search history.

(56) References Cited

U.S. PATENT DOCUMENTS

| | | |
|---|---|---|
| 5,995,936 A | 11/1999 | Brais et al. |
| 10,074,402 B2 | 9/2018 | Mahate et al. |
| 11,270,524 B2 | 3/2022 | Winterstein et al. |
| 2002/0138269 A1 | 9/2002 | Philley |
| 2007/0203660 A1* | 8/2007 | North ................. G06Q 10/06 210/85 |
| 2010/0127922 A1 | 5/2010 | Sooy |
| 2010/0333155 A1* | 12/2010 | Royall ............... H04N 21/2662 348/207.1 |
| 2012/0265867 A1* | 10/2012 | Boucher ............ H04W 4/90 709/223 |
| 2014/0025593 A1* | 1/2014 | Dolin ................ G06Q 30/018 705/317 |

(Continued)

OTHER PUBLICATIONS

AutoRepo: A general framework for multi-modal LLM-based automated construction reporting. arXiv Article: arXiv.org; ARXIV ID: 2310.07944; Publication Date: Oct. 11, 2023; Authors: Pu, Hongxu • Yang, Xincong • Li, Jing • Guo, Runhao • Li, Heng. (Year: 2023).*

(Continued)

*Primary Examiner* — Matthew T Sittner
(74) *Attorney, Agent, or Firm* — Briggs Intellectual Property Law; Jeremy A. Briggs (57) ABSTRACT

An inspection system having a system transceiver and a system processor is disclosed. The system transceiver may be configured to obtain a video from a user device. The video may include a user comment on inspection. The system processor may be configured to obtain the video from the system transceiver, and analyze video content responsive to obtaining the video. The system processor may identify one or more predetermined keywords in the video content based on the analysis, and select a regulatory code, from a plurality of regulatory codes, associated with the one or more predetermined keywords. The system processor may generate an inspection report based on the user comment, the regulatory code, and a portion of the video content associated with the one or more predetermined keywords.

19 Claims, 5 Drawing Sheets

(56) References Cited

U.S. PATENT DOCUMENTS

| | | | | |
|---|---|---|---|---|
| 2016/0109501 | A1* | 4/2016 | Spark | H05K 7/1438 |
| | | | | 348/374 |
| 2018/0313868 | A1* | 11/2018 | Sljivar | G01P 21/00 |
| 2019/0069002 | A1* | 2/2019 | Onoda | H04N 21/25891 |
| 2020/0142923 | A1* | 5/2020 | Kusaki | G06Q 10/00 |
| 2021/0133848 | A1* | 5/2021 | Ghorbani | G06Q 50/01 |
| 2021/0310960 | A1* | 10/2021 | Li | G05D 1/247 |
| 2022/0115043 | A1* | 4/2022 | Gupta | G06F 40/279 |
| 2022/0150343 | A1* | 5/2022 | Hodge | H04W 12/06 |
| 2022/0318818 | A1* | 10/2022 | Han | G06Q 10/00 |
| 2023/0326172 | A1* | 10/2023 | Dhariwal | G06V 10/42 |
| | | | | 382/190 |
| 2024/0095759 | A1* | 3/2024 | Murata | G06Q 10/10 |
| 2025/0200233 | A1* | 6/2025 | Balakrishnan | G06Q 50/165 |

OTHER PUBLICATIONS

Understanding On-Site Inspection of Construction Projects Based on Keyword Extraction and Topic Modeling. IEEE Periodical Publication: IEEE Xplore, Publication Date: Jan. 1, 2020; Published in: IEEE Access (vol. 8, 2020, pp. 198503-198517) (Year: 2020).*
Nick Heim; Title: "Automation of Inspection Reporting Using Artificial Intelligence"; dated: Apr. 29, 2024 Link: https://engineeringmanagementinstitute.org/automation-inspection-reporting-using-artificial-intelligence/.

* cited by examiner

ARTIFICIAL INTELLIGENCE INSPECTION SYSTEM AND METHOD

FIELD

The present disclosure relates to inspection systems and methods, and more particularly to Artificial Intelligence (AI) based inspection systems and methods.

BACKGROUND

Fire inspection is a process of examining a building for potential fire hazards, and ensuring compliance with fire codes, regulations, and standards. Typically, the fire inspection process is executed by qualified fire inspectors. The fire inspectors visit the building and conduct a thorough examination of the fire safety features and conditions in the building. After visiting the building, the fire inspectors are required to document the findings and prepare an inspection report. In general, the fire inspectors spend a lot of time in preparing the inspection report, which affects the inspectors' productivity. Similarly, it is known that there are various types of inspections in different industries that require documented reporting of the findings of the inspection and the associated technical/regulated requirements, which consume considerable time of the associated inspectors.

Therefore, there exists a need for a system and method that may efficiently assist the inspectors in inspecting the buildings/area/item and documenting the findings.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure describes an Artificial Intelligence (AI) based inspection system and method that may assist an inspector/user to perform inspection of a building/item/other area and prepare an inspection report (e.g., a fire inspection report). The AI system may be communicatively coupled with a user device associated with the user, via a network. The user may carry the user device for fire inspection (or for any other type of inspection), and may transmit information associated with the inspection to the AI system (or a server hosting the AI system). The user device may include or may be communicatively coupled to an image capturing device (or a camera). The camera may be configured to capture a video of the building/facility under inspection. The camera may be further configured to capture user comments/commentary (e.g., audio commentary) that the user may provide/utter while capturing the video. Stated another way, the video captured by the camera may include the user comments provided by the user.

The camera may be configured to transmit the real-time video to the user device. The user device may obtain the real-time video from the camera, and may transmit the video to the server hosting the AI system. In some aspects, the user device may determine if the network is available between the user device and the server (or if the network strength is greater than a threshold value), and transmit the real-time video to the server when the network may be available. On the other hand, responsive to determining that the network may be unavailable, the user device may store/buffer the video in a user device memory, and may transmit the video to the server when the network is available.

The server may obtain the video from the user device, and may analyze the video content. In some aspects, the server may initiate the analysis when the complete video is uploaded/transmitted to the server by the user device. Responsive to obtaining the video, the server may extract audio (or audio comments or user comments) from the video. Thereafter, the server may convert the audio into text, and identify the presence of one or more predetermined keywords in the text. The presence of predetermined keywords may indicate a violation in the inspection.

Responsive to determining the presence of one or more predetermined keywords in the text, the server may determine a time stamp associated with the utterance of the predetermined keywords in the audio file, and may extract images from the video on the determined time stamp. In addition, the server may select/identify a regulatory code, from a plurality of regulatory codes, based on the identified predetermined keywords.

The server may be further configured to prepare an inspection report automatically. The inspection report may include the user comments, the extracted images, and the selected regulatory code. The server may store the inspection report and/or transmit the inspection report to the user device. The user may review the inspection report and may edit the inspection report. In some aspects, the user may provide feedback on the inspection report, and the server may update the inspection report based on the user feedback.

In further aspects, the server may assist the user in performing the inspection. For example, the server may obtain the real-time video from the user device, analyze the video in real-time, and may provide step-by-step instructions to the user (via the user device) to perform the inspection efficiently and accurately. In some aspects, the server may also determine if the user may have missed inspection of any specific area in the building based on the analysis, and may provide real-time notification to the user to perform the inspection of the specific area. To perform such analysis, the server may compare the real-time video (or frames of the video) obtained from the user device with pre-stored videos of similar buildings or pre-stored geometry/architecture of the building that is being inspected, and determine if the video covers the complete building or any specific area is missing.

In alternative aspects, the server may obtain the video from the user device and may perform the video analysis without the user comments. Stated another way, the server may assist in performing the inspection even if the video does not include the user comments. In such cases, the server may compare the real-time video (or frames of the video) with pre-stored videos, and determine violation based on the comparison (e.g., missing fire extinguisher in corner portion). The server may generate a text corresponding to the violation, and prepare the inspection report automatically including the generated text. The inspection report may further include details of the violation such as images from the video, converted text associated with the violation, and/or the like.

The present disclosure discloses a system and method that may assist a user/inspector in inspecting a building/area/item and documenting the findings. The present disclosure facilitates the user to finalize the report quickly and efficiently, so that the inspector's productivity may be enhanced. In addition, the system assists the user in performing the inspection accurately, and may also be used for providing training to new inspectors.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

Figure 1:
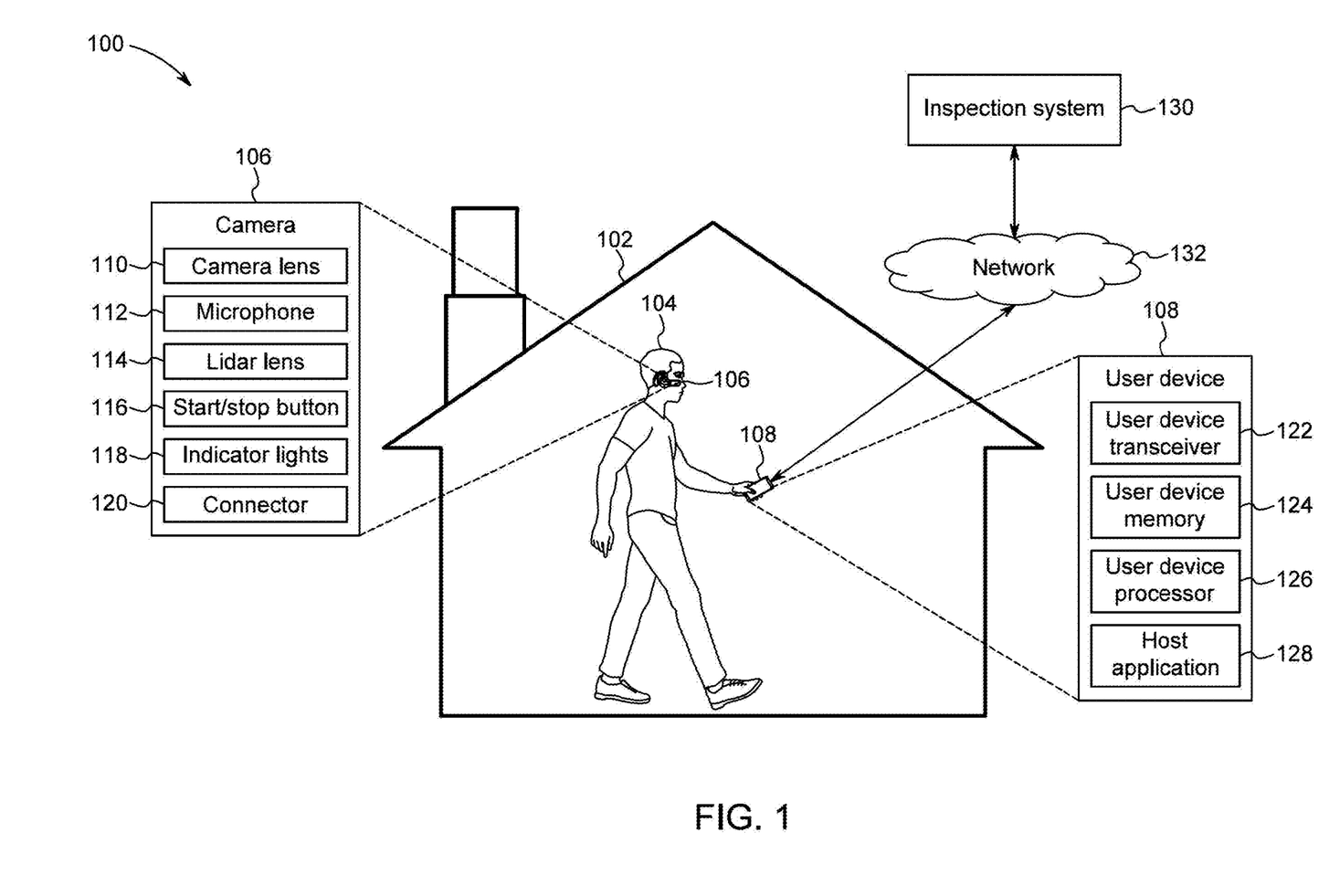
FIG. 1 depicts an environment in which techniques and structures for providing the systems and methods disclosed herein may be implemented.

FIG. 1 depicts an environment 100 in which techniques and structures for providing the systems and methods disclosed herein may be implemented. FIG. 1 will be described in conjunction with FIGS. 2-4.

The environment 100 may include a building 102 (or a facility/item/vehicle/any area including external area) that may be getting inspected by an inspector 104 (hereinafter referred to as "user 104"). The environment 100 may further include an image capturing device 106 (hereinafter referred to as "camera 106") and a user device 108 that may be associated with the user 104. The user device 108 may include, for example, a mobile phone, a laptop, a computer, a tablet, a wearable device (e.g., a smartwatch), or any other device with communication capabilities. The camera 106 and the user device 108 may be communicatively coupled to each other. In some aspects, the camera 106 may be a part of the user device 108. Alternatively, the camera 106 may not be part of the user device 108, and may be a separate device as shown in FIG. 1. In the latter scenario, the camera 106 may be a wearable stand-alone camera that the user 104 may wear via a headband (or by using any other mechanism).

The camera 106 may be configured to capture a video of a building interior and/or exterior portion. The camera 106 may include a plurality of components including, but not limited to, a camera lens 110, a microphone 112, a Light Detection and Ranging (lidar) lens 114, a start and stop button 116, indicator lights 118, a connector 120, and/or the like. The camera lens 110 may be configured to focus light beams associated with images situated in front of the camera 106. The microphone 112 may configured be configured to record user comments (or audio comments from the user 104) as the user 104 inspects the building 102 and provides commentary. In some aspects, the user 104 may record the user comments on inspection while recording the video in the building 102 by using the camera 106. Thus, the video captured by the camera 106 may include the user comments provided by the user 104.

The lidar lens 114 may be configured to measure or assist in measuring distances between objects present in images/videos captured by the camera 106, and make highly accurate 3D maps and models of the building 102 as the user 104 captures the building video/images while inspecting. For example, the lidar lens 114 may assist in determining floor level, stair spacing, etc. The start and stop button 116 may be configured to start and stop video recording. In some aspects, the camera 106 may include two separate buttons to start and stop the video recording. Alternatively, the camera 106 may include a single button to start and stop the video recording.

The indicator lights 118 may be configured to indicate whether the camera 106 is in use or not. The indicator lights 118 may turn-on when the camera 106 may be in use, and may turn-off when the camera 106 may not be in use. The connector 120 may be a transceiver that may be configured to communicatively connect the camera 106 with the user device 108. The connector 120 may be configured to transmit the video recording captured by the camera 106 to the user device 108. The connector 120 may be a camera transceiver that may be configured to transmit the video recording via a cable or a network 132, which is described later below.

The user device 108 may include a plurality of components including, but not limited to, a user device transceiver 122, a user device memory 124, a user device processor 126, a host application 128, and/or the like, which may be communicatively coupled to each other. The host application 128 may be an application that may be hosted on the user device 108, and may enable the user 104 to access an inspection system 130 (that may be hosted on a remote server), via a network 132. The inspection system 130 may assist the user 104 to perform the building inspection and prepare an inspection report after the inspection. The network 132, as described here, illustrates an example communication infrastructure in which the connected devices discussed in various embodiments of this disclosure may communicate. The network 132 may be and/or include the Internet, a private network, public network or other configuration that operates using any one or more known communication protocols such as transmission control protocol/Internet protocol (TCP/IP), Bluetooth®, Bluetooth® Low Energy (BLE), Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The user device transceiver 122 may be configured to receive and transmit data/information from/to the camera 106 and/or the inspection system 130, via the network 132. For example, the user device transceiver 122 may receive the video (e.g., real-time video) from the camera 106 (e.g., via the connector 120), and may transmit the video to the inspection system 130. In some aspects, the user device transceiver 122 may be configured to transmit a request to the camera 106 to capture the video, and may obtain the video responsive to transmitting the request. In this case, the camera 106 may start to record the video, responsive to receiving the request from the user device transceiver 122. Further, responsive to starting the recording, the camera 106 may begin to transmit the real-time video recording to the user device transceiver 122. In additional aspects, the user device transceiver 122 may obtain the inspection report (e.g., an inspection report 300, shown in FIG. 3 and described later below) from the inspection system 130.

The user device processor 126 may utilize the user device memory 124 to store programs in code and/or to store data for performing aspects in accordance with the disclosure. The user device memory 124 may be a non-transitory computer-readable storage medium or memory storing a program code that enables the user device processor 126 to perform operations in accordance with the present disclosure. The user device memory 124 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In some aspects, the user device processor 126 may obtain the video from the user device transceiver 122, and may determine whether the network 132 is available between the user device 108 and the inspection system 130. Stated another way, the user device processor 126 may determine if a network strength associated with the network 132 is greater than a threshold. Responsive to determining that the network strength is greater than the threshold (or the network 132 is available), the user device processor 126 may transmit the video to the inspection system 130. Responsive to determining that the network strength is less than the threshold (or the network 132 is unavailable), the user device processor 126 may store or buffer the video in the user device memory 124. In this case, the user device processor 126 may fetch the video (or the buffered video) from the user device memory 124, and transmit the video to the inspection system 130 when the network 132 becomes available.

In addition, the user device processor 126 may be further configured to fetch/determine a real-time user device location (or Global Positioning System (GPS) data) associated with the user device 108, and transmit the real-time user device location to the inspection system 130. In some aspects, the user device processor 126 or the host application 128 may automatically segment the video into smaller files and then transfer the segmented video.

Figure 2:
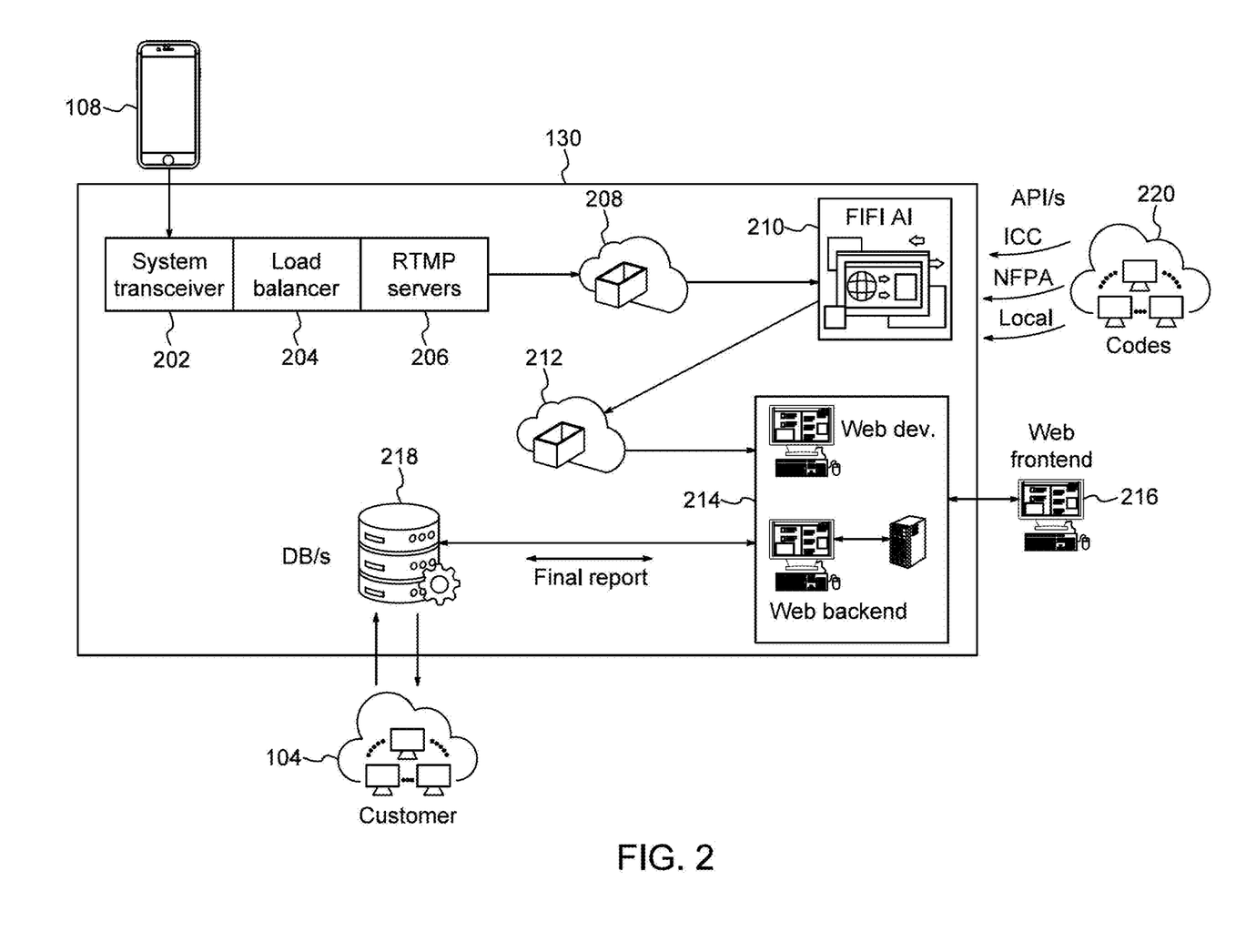
FIG. 2 depicts a block diagram of an inspection system in accordance with the present disclosure.

The inspection system 130 may include a plurality of components including, but not limited to, a system transceiver 202, a load balancer 204, one or more Real-Time Messaging Protocol (RTMP) servers 206 (including Real-Time Messaging Protocol Secure (RTMPS)), a first storage 208, a system processor 210, a second storage 212, a web backend 214, a web frontend 216, a third storage 218, and/or the like, which may be communicatively coupled with each other, as shown in FIG. 2. The storages (e.g., the first storage 208, the second storage 212, and the third storage 218) may collectively form a system memory, and may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

The system transceiver 202 may be configured to obtain/receive the information/data from the user device 108. For example, the system transceiver 202 may receive the video (e.g., the real-time video) captured by the camera 106 from the user device 108, via the user device transceiver 122. In addition, the system transceiver 202 may be configured to transmit information/data to a user interface. In some aspects, the user interface may be associated with the user device 108. In other aspects, the user interface may be associated with another user device (not shown). Further, the system transceiver 202 may be configured to transmit the video to one or more system components, e.g., the load balancer 204.

The load balancer 204 may be configured to obtain the video from the system transceiver 202. The load balancer 204 may be configured to redirect the video to an available RTMP server 206 (including Real-Time Messaging Protocol Secure (RTMPS)), from plurality of RTMP servers. The RTMP server 206 may allow live and Video-on-demand (VOD) streaming using RTMP. The RTMP server 206 may be configured to store the video in the first storage 208.

The system processor 210 (which may be, e.g., a fifi module) may be configured to monitor the incoming videos in the first storage 208, obtain the video from the first storage 208, and analyze video content associated with the video responsive to obtaining the video. In some aspects, the system processor 210 may obtain the video when the video is completely uploaded to the first storage 208. Alternatively, the system processor 210 may obtain the video in real-time. Based on the video content analysis, the system processor 210 may identify presence of one or more predetermined keywords in the video content.

In some aspects, the system processor 210 may include one or more AI-powered tools to enhance or extract information from the video obtained from the first storage 208. For example, the system processor 210 may use the AI tools that may be based on Large Language Model (LLM) to extract audio (or audio/user comments that the user 104 provides while capturing the video by using the camera 106) from the video captured by the camera 106. Stated another way, the system processor 210 may use the AI tools to strip the audio from the video captured by the camera 106/obtained from the first storage 208.

The system processor 210 may store the extracted audio comments or user comments in an internal database (not shown) that may be communicatively coupled with the system processor 210. Further, responsive to extracting the audio from the video, the system processor 210 may convert the extracted audio into text (e.g., using speech-to-text AI tools). Responsive to converting the audio into text, the system processor 210 may fetch a list of predetermined keywords that may be pre-stored in the internal database (not shown), and compare the list of predetermined keywords with the converted text. The system processor 210 may identify the presence of predetermined keywords in the text based on the comparison. The predetermined keywords may be a single word or may be a series of words (or a sentence or phrase), that may be obtained from the user 104. For example, the keywords may include terms like "violation, fire extinguisher not mounted". In further aspects, the system processor 210 may identify the presence of predetermined keywords in the audio from the audio itself (e.g., without converting the audio into text).

When the system processor 210 identifies the predetermined keywords in the text/audio, the system processor 210 may determine that one or more violations are present in the building 102 or found by the user 104 during the building inspection. For example, the system processor 210 may determine that there may be a violation as the fire extinguisher is not mounted, based on the user comments captured in the video during the building inspection. As another example, the system processor 210 may identify other violations such as issues with electrical cords, blocked exits, lack of exit signs, faulty lightings, fire extension issues, incorrect sprinkler systems, broken smoke detectors, non-functional alarm systems, and/or the like.

Responsive to determining the violation by identifying the presence of predetermined keywords in the text, the system processor 210 may identify images/frames from the video that may be associated with the predetermined keywords, and extract the identified images/frames. Stated another way, responsive to identifying the presence of predefined keywords in the text, the system processor 210 may identify those images/frames in the video in which the user 104 may have spoken the predetermined keywords. In an exemplary aspect, to identify/extract such images/frames, the system processor 210 may determine time stamps associated with the predetermined keywords in the extracted audio/text, and correlate the time stamps with the time stamp of the video. The system processor 210 may then extract the images based on the correlation. For example, the system processor 210 may determine the time stamp when the word "violation" was uttered by the user 104 or present in the audio, and then extract images from the video at the determined time stamp. Responsive to identifying the images/frames, the system processor 210 may store the extracted images/frames in the internal database.

In addition, responsive to determining the violation, the system processor 210 may determine a violation type. To determine the violation type, the system processor 210 may fetch a mapping of a plurality of predetermined keywords and with a plurality of violation types (which may be pre-stored in a system memory). The system processor 210 may then correlate the determined predetermined keywords that are present in the text with the fetched mapping, and then identify the violation type based on the correlation.

In further aspects, the system processor 210 may be configured to obtain a plurality of regulatory codes from an external server 220 (e.g., via an API call). The regulatory codes may include International Fire Code Building Code (ICC), National Fire Protection Association (NFPA) code, local codes, and/or the like. Responsive to obtaining the plurality of regulatory codes, the system processor 210 may select a regulatory code (or one or more regulatory codes) from the plurality of regulatory codes based on the determined predetermined keywords. The selected regulatory code may be associated with the determined predetermined keywords (or pre-identified based on the user based regulations that are applicable). Specifically, the system processor 210 may correlate the determined violation type with the plurality of regulatory codes, and select the regulatory code based on the correlation. For example, the system processor 210 may identify that the violation is associated with the installation of the sprinkler system based on the presence of these keywords in the video. Responsive to such determination of the violation type, the system processor 210 may determine the regulatory code associated with the installation of the sprinkler system. The system processor 210 may then store the selected regulatory code in the internal database.

Figure 3:
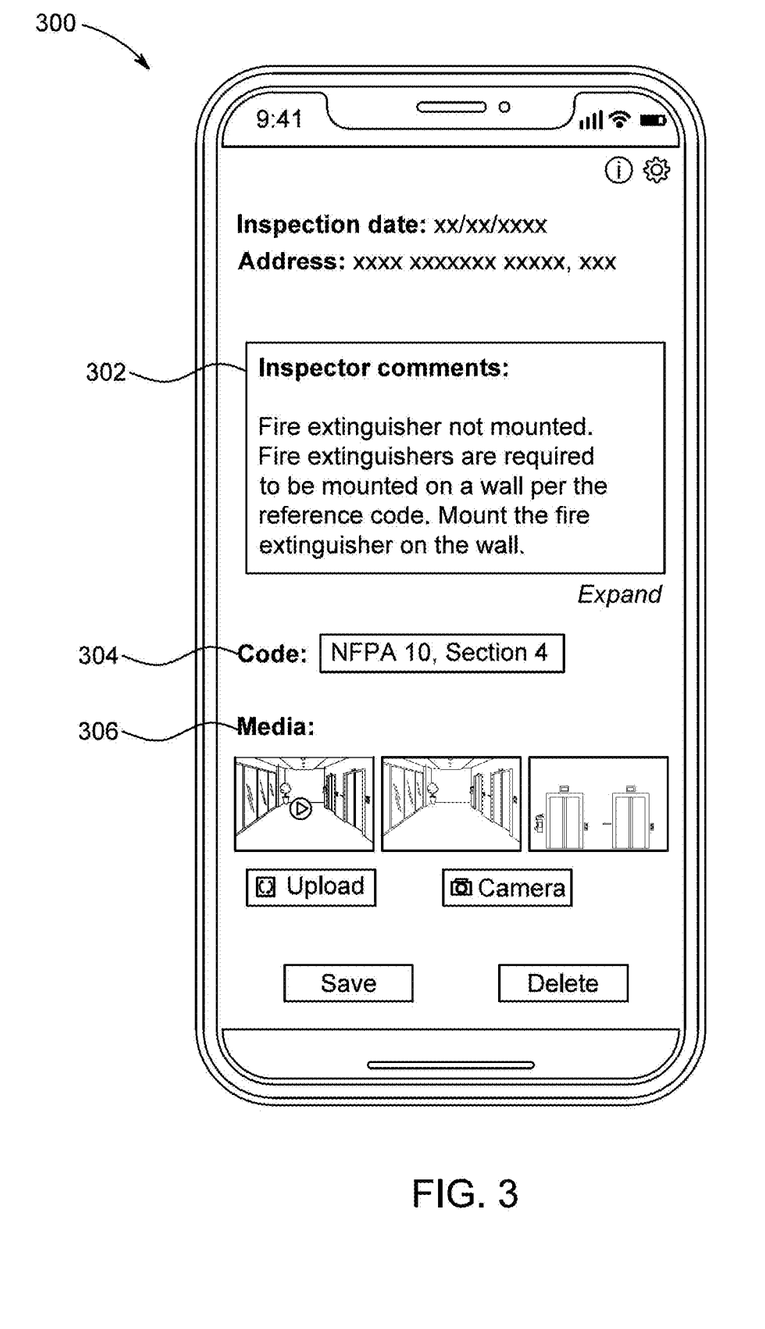
FIG. 3 depicts an example inspection report in accordance with the present disclosure.

The system processor 210 may be further configured to fetch the stored regulatory code and the stored images/frames from the internal database, and generate an inspection report 300 (as shown in FIG. 3) for the building 102 automatically. The inspection report 300 may include, but not limited to, transcripts of user comments 302 that may be provided by the user 104 while capturing the video, selected regulatory code(s) 304, and a portion of the video content (e.g., extracted images/frames/media 306 associated with the time stamps at which the user 104 uttered the predetermined keywords for fire inspection violation(s)), as shown in FIG. 3. In addition, the inspection report 300 may include the GPS data received from the user device 108, which may indicate the building address or the exact geolocation where the video was captured by the user 104 via the camera 106.

The system processor 210 may store the inspection report 300 in the internal database. The report may be in any file format. In addition, the system processor 210 may store the inspection report 300 in the second storage 212. In some aspect, the system processor 210 may convert the inspection report file format to JSON, and then store the converted inspection report in the second storage 212.

The converted inspection report may be transmitted to the web frontend 216, via the web backend 214. The web frontend 216 may be customer/user facing interface that enables the user 104 to view and interact with the inspection system 130 (e.g., via the host application 128 stored in the user device 108). In some aspects, the web backend 214 may receive a user request to view the inspection report 300 via the web frontend 216, and may transmit/output the inspection report 300 on the host application 128 via the web frontend 216. In further aspects, the web backend 214 may store the converted inspection report in the third storage 218.

In some aspects, the user 104 (or customer) may access the inspection report (via the user device 108 or any other device) stored in the third storage 218. In some aspects, the system transceiver 202 may receive the request from the user, and transmit the request to the system processor 210. The system processor 210 may fetch the inspection report from the third storage 218 (e.g., via API call), and transmit the inspection report to the user device 108 via the system transceiver 202. The user 104 may view, review (e.g., confirm the selected regulatory code), and/or edit the inspection report, and save the final inspection report in the third storage 218. In some aspects, the system transceiver 202 may obtain user feedback on the inspection report and transmit the feedback to the system processor 210. The system processor 210 may obtain the feedback and update the inspection report based on the feedback, and transmit the updated report to the user 104/user device 108, in the manner described above. The user 104 may further download the final inspection report on the user device 108 (or any other user device), and may transmit the final inspection report to relevant person/department. In this manner, the inspection system 130 facilitates the user 104 to prepare the inspection report efficiently and quickly.

In addition or alternatively to determining the violation(s) using the predetermined keywords, the system processor 210 may automatically determine violation by using/analyzing the video content captured by the camera 106. In this case, the user 104 may not require the user 104 to provide the user comments during the inspection or while capturing the video via the camera 106. In this case, the system processor 210 may obtain the video from the camera 106/user device 108, analyze the video content, and automatically determine the violation based on the video analysis. For example, the system processor 210 may determine that the smoke detectors are missing in the frames captured by the camera 106, based on the video analysis. In this case, the system processor 210 may determine that the building 102 may have violations associated with smoke detectors. In such cases, the system processor 210 may compare the real-time video (or frames of the video) with pre-stored videos, and determine violation based on the comparison (e.g., missing fire extinguisher in corner portion). The system processor 210 may generate a text corresponding to the violation, and prepare the inspection report automatically including the generated text. The inspection report may further include details of the violation such as images from the video, converted text associated with the violation, and/or the like. In further aspects, the system processor 210 may determine the violation based on the information captured by the lidar lens 114 (e.g. by using the depth information captured in the frames obtained from the camera 106/user device 108).

In addition, the system processor 210 may be configured to obtain the video in real-time from the user device 108, analyze the video in real-time (or near real-time), and may provide step-by-step instructions to the user (via the user device) to perform the inspection efficiently and accurately. In some aspects, the system processor 210 may also determine that the user 104 has not inspected a specific area in the building 102 based on the analysis, or may have missed inspecting a specific area in the building 102. To perform such analysis, the system processor 210 may compare the real-time video (or frames of the video) obtained from the user device 108 with pre-stored videos of similar buildings or pre-stored geometry/architecture of the building that is being inspected, and determine if the video covers the complete building or any specific area is missing. The system processor 210 may output a real-time notification to the user device 108 (via the user device transceiver 122) indicating that the user 104 has not inspected the specific area, responsive to determining that the user 104 not inspected the specific area. Responsive to viewing/hearing the notification, the user 104 may inspect the specific area. The system processor 210 may further obtain new video from the camera 106, and then confirm whether the user 104 has inspected the specific area correctly, based on the newly obtained video from the camera 106.

Figure 4:
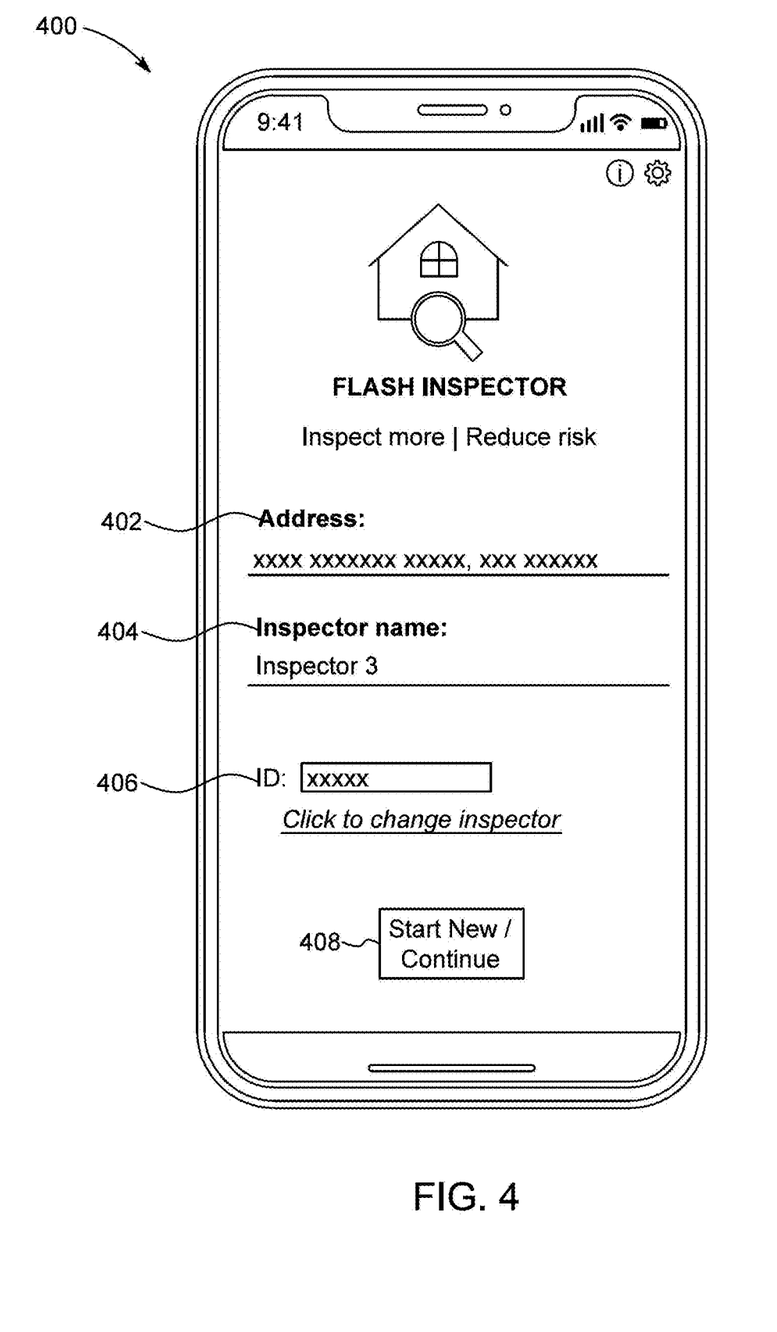
FIG. 4 depicts an example snapshot of a host application hosted on a user device in accordance with the present disclosure.

In operation, the user 104 may schedule a visit to the building 102 for inspection. To initiate the inspection process, the user 104 may access the host application 128 installed in the user device 108. An example snapshot 400 of host application hosted on the user device 108 is shown in FIG. 4. The snapshot 400 depicts different fields that may be entered/inputted by the user 104. For example, the user 104 may input a building address 402, a user/inspector name 404, a user/inspector ID 406, and/or the like. In some aspects, the building address 402 may be determined automatically from the GPS (e.g., using the user device 108), and entered automatically in the host application. The user 104 may then click "start new/continue" button 408 to begin the inspection process. In addition, the user 104 may press the start/stop button 116 of the camera 106 to start the video recording.

When the user 104 presses the start/stop button 116 and initiates the inspection process, the camera 106 may start to capture the video. The user 104 may comment on what the user 104 sees or provide commentary on the observation. The user commentary may be part of the video or captured as "audio" of the video recording. The camera 106 may then transmit the real-time video to the user device 108 (via the connector 120 and the user device transceiver 122). The user device processor 126 may obtain the video, and determine if the network 132 is available between the user device 108 and the inspection system 130. When the user device processor 126 determines that the network 132 is available, the user device processor 126 may transmit the real-time video to the inspection system 130. Responsive to a determination that the network 132 is unavailable, the user device processor 126 may buffer/store the video in the user device memory 124 until the network 132 is available, as described above.

The inspection system 130 (or the system transceiver 202) may obtain the real-time video from the user device 108. Responsive to obtaining the video, the load balancer 204 may redirect the video to an RTMP server (of the plurality of RTMP servers 206). The RTMP server may save the video in the first storage 208. The system processor 210 may obtain the video from the first storage 208, and may extract user comments (or audio) from the video, and convert the extracted audio into text (e.g., by using speech-to-text conversion tool). The system processor 210 may then identify or determine the presence of predetermined keywords in the text, and determine violation of inspection responsive to determining the presence of the predetermined keywords in the text.

Responsive to determining the violation(s), the system processor 210 may extract images from the video at time stamps at which the predetermined keywords were uttered by the user 104, as described above. The system processor 210 may further select a regulatory code from a plurality of regulatory codes, which may be associated with the predetermined keywords. The system processor 210 may then generate the inspection report 300 having the user comments, the regulatory code, the extracted images, etc. The inspection report 300 may be transmitted to the user device 108 (or any other device) for user review, as described above. The system processor 210 may receive user feedback on the inspection report 300, and may update the inspection report 300 based on the feedback.

In some aspects, the inspection report 300 may be stored in the third storage 218. When the user 104 accesses the web portal associated with the inspection system 130, the user 104 may access the inspection report, review, and edit (and/or download) the inspection report 300 and save the final inspection report in the third storage 218.

Although the present disclosure is directed towards assisting the user 104 in performing fire inspection and preparing the inspection report, the present disclosure should not be construed as limited to this aspect. The present disclosure may work efficiently for other types of inspections as well. For example, the present disclosure may work efficiently for explosion investigations, ship inspections, building code inspections, wildland fire mitigation, and/or the like.

Figure 5:
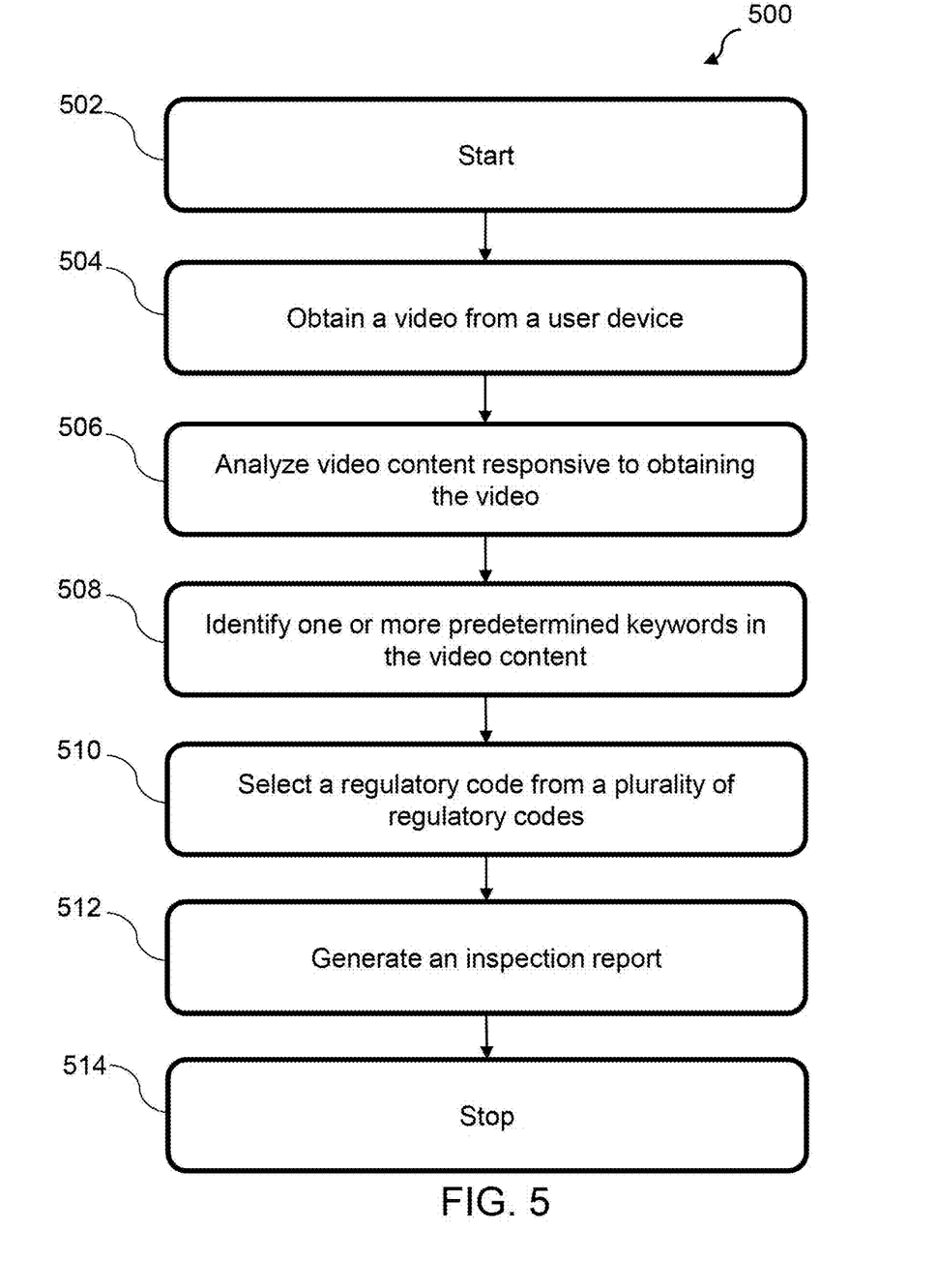
FIG. 5 depicts a flow diagram of an example inspection method in accordance with the present disclosure.

FIG. 5 depicts a flow diagram of an example inspection method 500 in accordance with the present disclosure. FIG. 5 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 500 starts at step 502. At step 504, the method 500 may include obtaining, by the system processor 210, the video from the user device 108. As described above, the video may include user comments (or audio comments from the user 104). At step 506, the method 500 may include analyzing, by the system processor 210, video content responsive to obtaining the video. At step 508, the method 500 may include identifying, by the system processor 210, one or more predetermined keywords in the video content based on the analysis. At step 510, the method 500 may include selecting, by the system processor 210, a regulatory code, from a plurality of regulatory codes, associated with the identified predetermined keywords. At step 512, the method 500 may include generating, by the system processor 210, the inspection report 300 based on the user comment, the regulatory code, and a portion of the video content associated with the identified predetermined keywords. The video content may include images extracted from the video based on the predetermined keywords.

At step 514, the method 500 may stop.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. An inspection system comprising:
    a system transceiver configured to obtain a video from a user device, wherein the video comprises a user comment on inspection; and
    a system processor communicatively coupled to the system transceiver, wherein the system processor is configured to:
        obtain the video from the system transceiver;
        extract an audio from the video responsive to obtaining the video;
        convert the audio into text;
        identify one or more predetermined keywords in the video content from the text;
        determine a time stamp associated with the one or more predetermined keywords in the audio;
        extract images from the video associated with the one or more predetermined keywords based on the time stamp;
        select a regulatory code, from a plurality of regulatory codes, associated with the one or more predetermined keywords; and
        generate an inspection report based on the user comment, the regulatory code, and the images associated with the one or more predetermined keywords.

2. The inspection system of claim 1, wherein the user device is configured to obtain the video from an image capturing device that is configured to capture the video.

3. The inspection system of claim 2, wherein the image capturing device comprises camera lens and Light Detection and Ranging (lidar) lens.

4. The inspection system of claim 2, wherein the image capturing device comprises a start button and a stop button.

5. The inspection system of claim 2, wherein the image capturing device comprises a microphone configured to record the user comment.

6. The inspection system of claim 1, wherein the system processor is further configured to store the inspection report in a system memory.

7. The inspection system of claim 1, wherein the system transceiver is further configured to transmit the inspection report to the user device and obtain a user feedback on the inspection report.

8. The inspection system of claim 1, wherein the system processor is further configured to:
obtain the video in real-time from the user device;
determine that a user associated with the user device has not inspected a specific area based on the video; and
output a real-time notification to the user device indicating that the user has not inspected the specific area.

9. The inspection system of claim 8, wherein the system processor is further configured to:
obtain a pre-stored architecture of a building being inspected;
correlate the video with the pre-stored architecture;
identify that the video does not cover an entire building based on the correlation; and
determine that the user associated with the user device has not inspected the specific area based on the identification.

10. A user device comprising:
a user device transceiver configured to obtain a video from an image capturing device configured to capture the video, wherein the video comprises a user comment on inspection;
a user device processor communicatively coupled to the user device transceiver, wherein the user device processor is configured to:
obtain the video from the user device transceiver;
determine that a network is available between the user device and an external inspection system; and
transmit the video to the external inspection system responsive to determining that the network is available, wherein the external inspection system is configured to:
extract an audio from the video responsive to obtaining the video;
convert the audio into text;
identify one or more predetermined keywords in the video content from the text;
determine a time stamp associated with the one or more predetermined keywords in the audio;
extract images from the video associated with the one or more predetermined keywords based on the time stamp;
select a regulatory code, from a plurality of regulatory codes, associated with the one or more predetermined keywords; and
generate an inspection report based on the user comment, the regulatory code, and the images associated with the one or more predetermined keywords.

11. The user device of claim 10, wherein the image capturing device comprises Light Detection and Ranging (lidar) lens and camera lens.

12. The user device of claim 10, wherein the image capturing device comprises a start button and a stop button.

13. The user device of claim 10, wherein the image capturing device comprises a microphone configured to record the user comment.

14. The user device of claim 10, wherein the user device transceiver is configured to transmit a request to the image capturing device to capture the video, and wherein the user device transceiver is configured to obtain the video responsive to transmitting the request.

15. The user device of claim 10, wherein the user device processor is further configured to transmit Global Positioning System (GPS) data to the external inspection system.

16. The user device of claim 10, wherein the user device processor is further configured to store the video in a user device memory responsive to a determination that the network is unavailable.

17. The user device of claim 10, wherein the user device processor is further configured to obtain the inspection report from the external inspection system.

18. The user device of claim 10, wherein the user device processor is further configured to:
segment the video into smaller files responsive to obtaining the video; and
transmit segmented video to the external inspection system.

19. A non-transitory computer-readable storage medium having instructions stored thereupon which, when executed by a processor, cause the processor to:
obtain a video from a user device, wherein the video comprises a user comment on inspection;
extract an audio from the video responsive to obtaining the video;
convert the audio into text;
identify one or more predetermined keywords in the video content from the text;
determine a time stamp associated with the one or more predetermined keywords in the audio;
extract images from the video associated with the one or more predetermined keywords based on the time stamp;
select a regulatory code, from a plurality of regulatory codes, associated with the one or more predetermined keywords; and
generate an inspection report based on the user comment, the regulatory code, and the images associated with the one or more predetermined keywords.

* * * * *